United States Patent Office 3,517,022
Patented June 23, 1970

3,517,022
CERTAIN 2-CARBAMOYL-1,2-BENZISO-THIAZOLONES
George A. Miller, Glenside, Sheldon N. Lewis, Willow Grove, and Andrew B. Law, Levittown, Pa., assignors to Rohm and Haas Company, Philadelphia, Pa., a corporation of Delaware
No Drawing. Continuation-in-part of application Ser. No. 621,786, Mar. 9, 1967. This application Oct. 3, 1967, Ser. No. 672,426
Int. Cl. C07d 91/10
U.S. Cl. 260—304　　　　　　　　　　　　　9 Claims

ABSTRACT OF THE DISCLOSURE

Disclosed herein are novel 2-substituted benzisothiazolones wherein the substituents are alkyl and monosubstituted carbamoyl radicals. These compounds exhibit a broad spectrum of biocidial properties and are particularly effective for the control of microorganisms, such as, bacteria, fungi and algae.

CROSS-REFERENCES TO RELATED APPLICATIONS

This application is a continuation-in-part application of U.S. Ser. No. 621,786, filed on Mar. 9, 1967 now abandoned.

BACKGROUND OF THE INVENTION

This invention relates to novel substituted benzisothiazolones, their preparation, compositions containing them, and their utilization in controlling biological organisms. More particularly, this invention is directed to certain 2 alkyl and 2-carbamoyl-1,2-benzisothiazolones. These compounds are useful as biocides and effectively inhibit the growth of microorganisms in various applications requiring fungicidal, bactericidal or algaecidal activity.

Several 1,2-benzisothiazolones and derivatives thereof have been disclosed in the prior art, and particularly in the patent literature, as useful for the control of microorganisms. For example, see British Pats. 848,130, 861,-379, 884,541 and 976.028. However, the novel compounds disclosed herein are clearly distinguishable from these known benzisothiazolones and represent, because of their broad spectrum biocidal activity, a substantial advance in the state of the art.

SUMMARY OF THE INVENTION

The novel compounds of this invention may be represented by the formula:

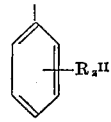

(I)

wherein R is alkyl of 4 to 24 carbon atoms or a carbamoyl group having the structure:

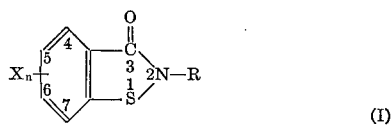

wherein $R^I$ is alkyl of 1 to 18 carbon atoms, or an aryl group of the formula:

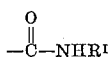

wherein $R^{II}$ is alkyl of 1 to 6 carbon atoms, halogen or nitro, and z is an integer from 0 to 3; and X is halogen, alkyl of 1 to 4 carbon atoms or alkoxy of 1 to 4 carbon atoms, and n is an integer from 0 to 2, provided that when R is alkyl of 4 to 24 carbon atoms, n is 1 or 2.

When R is alkyl, representative substituents thereof include butyl, pentyl, hexyl, isohexyl, heptyl, octyl, t-octyl, t-nonyl, decyl, dodecyl, t-tridecyl, tetradecyl, octadecyl, t-octadecyl and tetracosyl.

When R is the carbamoyl group, $R^I$ is typically methyl, ethyl, butyl, t-octyl, octadecyl, phenyl, 4-methylphenyl, 2,5-dimethylphenyl, 4-butylphenyl, 4-chlorophenyl, 3-bromophenyl, 3-chlorophenyl, 3,4-dichlorophenyl, 2,5-dichlorophenyl and 4-nitrophenyl.

Typical compounds within the scope of this invention include:

2-butyl-4-methyl-1,2-benzisothiazolone
2-butyl-5-bromo-1,2-benzisothiazolone
2-pentyl-4,6-dichloro-1,2-benzisothiazolone
2-pentyl-6-methoxy-1,2-benzisothiazolone
2-hexyl-5-methyl-1,2-benzisothiazolone
2-isohexyl-4,5-diethyl-1,2-benzisothiazolone
2-octyl-4-chloro-1,2-benzisothiazolone
2-octyl-4,7-dichloro-1,2-benzisothiazolone
2-t-octyl-6-chlora-1,2-benzisothiazolone
2-t-octyl-6-ethoxy-1,2-benzisothiazolone
2-nonyl-4-propoxy-1,2-benzisothiazolone
2-dodecyl-4,6-dichloro-1,2-benzisothiazolone
2-dodecyl-6-methyl-1,2-benzisothiazolone
2-t-tridecyl-6-methyl-1,2-benzisothiazolone
2-t-octadecyl-4,6-diethyl-1,2-benzisothiazolone
2-(N-4'-bromophenylcarbamoyl)-1,2-benzisothiazolone
2-(N-4'-butylphenylcarbamoyl)-1,2-benzisothiazolone
2-(N-3'-chlorophenylcarbamoyl)-1,2-benzisothiaolone
2-(N-3'-chlorophenylcarbamoyl)-4-methyl-1,2-benzisothiazolone
2-(N-3'-chlorophenylcarbamoyl)-4,6-dibromo-1,2-benzisothiazolone
2-(N-3',4'-dichlorophenylcarbamoyl)-1,2-benzisothiazolone
2-(N-3',4'-dichlorophenylcarbamoyl)-5-butyl-1,2-benzisothiazolone
2-(N-ethylcarbamoyl)-1,2-benzisothiazolone
2-(N-ethylcarbamoyl)-5-butoxy-1,2-benzisothiazolone
2-(N-methylcarbamoyl)-1,2-benzisothiazolone
2-(N-butylcarbamoyl)-5-chloro-1,2-benzisothiazolone
2-(N-4'-methylphenylcarbamoyl)-1,2-benzisothiazolone
2-(N-t-octylcarbamoyl)-1,2-benzisothiazolone
2-(N-t-octaylcarbamoyl)-4-methyl-6-chloro-1,2-benzisothiazolone
2-(N-octadecylcarbamoyl)-1,2-benzisothiazolone
2-(N-octadecylcarbamoyl)-4,6-dimethyl-1,2-benzisothiazolone
2-(N-4'-nitrophenylcarbamoyl)-1,2-benzisothiazolone The 2-alkyl benzisothiazolones of this invention may be prepared by reacting an amine with a substituted o-halosulfenylbenzoyl halide. This general reaction may be represented by the following equation:

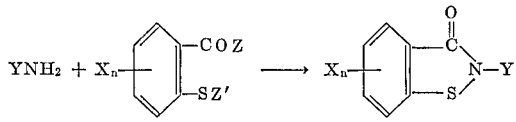

In the above reaction:

Y is alkyl of 4 to 24 carbon atoms;
Z and Z' are halogen atoms which may be the same or different, and are preferably chloro or bromo;
X is as defined for Formula I; and
$n$ is 1 or 2.

An acid acceptor such as a tertiary amine may be employed as a scavenger in this preparation. Representative acid acceptors include pyridine, trimethylamine and triethylamine. However, an excess of the amine reactant may also serve as the acid acceptor. Generally an equimolar ratio of reactants is preferred, but an excess of up to 3 or more moles may be employed if the amine is intended to serve the dual function of reactant and acid acceptor. While not required, the reaction is advantageously carried out in an inert organic solvent from the classes of aromatic hydrocarbon, halogenated aromatic hydrocarbon, amide, ester, aliphatic hydrocarbon, ether solvents, and the like. Suitable solvents include benzene, toluene, heptane, ethyl ether and dioxane. The reaction is generally conducted in a temperature range of −20° C. to 80° C. or more, and preferably in the range of 20° to 60° C.

The carbamoyl benzisothiazolones may be prepared by either of two methods. In the first procedure, an o-halosulfenylbenzoyl halide, such as for example, o-chlorosulfenylbenzoyl chloride is reacted with a substituted urea. This reaction may be represented by the following equation:

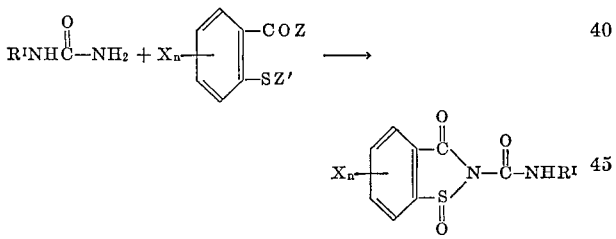

wherein:

$R^I$ is as defined for the carbamoyl group of Formula I;
Z and Z' are halogen atoms which may be the same or different, and are preferably chloro or bromo;
X and $n$ are as defined for Formula I.

Conditions, such as the utilization and choice of solvents along with the reaction temperature correspond to the amine-halosulfenylbenzoyl halide reaction described above. Although an equimolar ratio of reactants is prefered, an excess of up to 2 moles or more of the urea reactant may be employed. Acid acceptors common to the art are utilized.

A second method of synthesizing carbamoyl benzisothiazolones involves reacting 1,2-benzisothiazolone with an isocyanate. This reaction may be represented by the following equation:

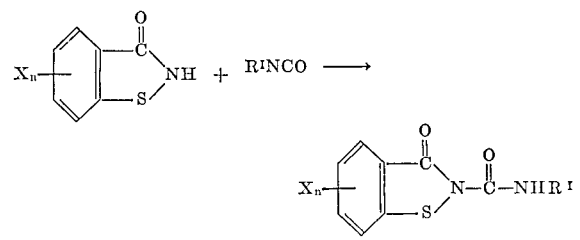

wherein $R^I$ is as defined for the carbamoyl group of Formula I, and X and $n$ are also as defined for Formula I.

Reaction conditions, including the choice of solvents, temperature, molar ratios, acid acceptors and the like correspond to the first method described for preparing carbamoyl benzisothiazolones.

While the above-described methods of preparing the benzisothiazolones of this invention are preferred, other procedures are available and may be employed where desired. One such additional method of preparation involves the condensation of a substituted o-halogenothiolbenzamide of the formula:

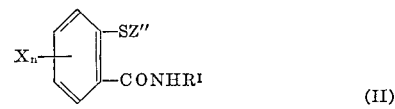

(II)

wherein $R^I$, X and $n$ are as defined for Formula I; and Z" is a halogen atom, preferably chloro or bromo. Such a condensation is readily carried out by the application of heat, preferably in the presence of a solvent or diluent such as glacial acetic acid. Likewise, condensation of the o-halogenothiolbenzamides may be accomplished with aqueous alkali or pyridine.

In addition, the novel compounds of this invention may also be prepared by disproportionation of 2,2'-dithio-bisbenzamides of the formula:

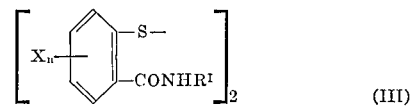

(III)

wherein $R^I$, X and $n$ are as defined for Formula I. Disproportionation of these compounds is readily carried out by alkali treatment, such as for example, heating with an aqueous sodium hydroxide solution.

By way of illustration, several examples of this invention are set forth hereinafter. However, they are not to be construed as limitations thereof. Parts are by weight unless otherwise indicated. Table I following, lists the substituents of Examples 1 to 6 along with the name of each such compound. The elemental analysis and melting point of each compound listed in Table I is given in Table II which also follows.

EXAMPLE 1

A solution of 8.9 parts (0.04 mole) of o-chlorosulfenylbenzoyl chloride in 108 parts of dry toluene was treated dropwise at 0° C. with a solution of 2.96 parts (0.04 mole) of N-methylurea in 15.8 parts of dry pyridine. A precipitate formed and the slurry was stirred at 25° C. for 4 hours to complete the reaction. The white precipitate was filtered off, washed thoroughly with water, dried and crystallized from acetone to yield 4.5 parts of 2-(N-methylcarbamoyl)-1,2-benzisothiazolone.

EXAMPLE 2

A solution of 3.1 parts (0.0205 mole) of 1,2-benzisothiazolone in 132 parts of benzene was treated with 2 drops of triethylamine followed by dropwise addition at 25° C. of 1.5 parts (0.0205 mole) of ethyl isocyanate. The slurry was stirred 12 hours at 25° C. Thereafter, the benzene was evaporated under vacuum to give a residue. Crystallization from ethanol yielded 4.1 parts of 2-(N-ethylcarbamoyl)-1,2-benzisothiazolone.

EXAMPLE 3

By following the procedure of Example 2, but employing t-octyl isocyanate in place of ethyl isocyanate, there was obtained 2 - (N-t-octylcarbamoyl)-1,2-benzisothiazolone.

EXAMPLE 4

A solution of 8.9 parts (0.04 mole) of o-chlorosulfenylbenzoyl chloride in 130 parts of dry toluene was treated at 0° C. with 6.32 parts (0.08 mole) of pyridine followed immediately by 6.8 parts (0.04 mole) of solid N-(3-chlorophenyl)urea. The reaction slurry was stirred at 25° C. for 12 hours. Then the solid was filtered off, washed thoroughly with toluene and water, and dried to yield 9.6 parts of 2-(N-3'-chlorophenylcarbamoyl)-1,2-benzisothiazolone.

Examples 5 and 6 were prepared according to the procedure of Example 2 by using 3,4-dichlorophenyl isocyanate and 4-nitrophenyl isocyanate respectively as the isocyanate reactant.

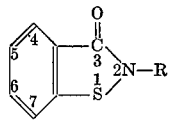

Benzisothiazolone examples

| Example No. | R | Name |
|---|---|---|
| 1 | —CONHCH$_3$ | 2-(N-methylcarbamoly)-1,2-benzisothiazolone. |
| 2 | —CONHCH$_2$CH$_3$ | 2-(N-ethylcarbamoyl)-1,2-benzisothiazolone. |
| 3 | —CONHC$_8$H$_{17}$—t | 2-(N-t-octylcarbamoyl)-1,2-benzisothiazolone. |
| 4 | —CONHC$_6$H$_4$Cl—3' | 2-(N-3'-chlorophenylcarbamoyl)-1,2-benzisothiazolone. |
| 5 | —CONHC$_6$H$_3$Cl$_2$—3',4' | 2-(N-3',4'-dichlorophenylcarbamoyl)-1,2-benzisothiazolone. |
| 6 | —CONHC$_6$H$_4$NO$_2$—4' | 2-(N-4'-nitrophenylcarbamoyl)-1,2-benzisothiazolone. | reacting a substituted amine with a substituted o-halosulfenylbenzoyl halide:

2-butyl-6-methyl-1,2-benzisothiazolone
2-butyl-4-propyl-1,2-benzisothiazolone
2-butyl-6-chloro-1,2-benzisothiazolone
2-pentyl-4-butyl-1,2-benzisothiazolone
2-pentyl-4-methoxy-1,2-benzisothiazolone
2-hexyl-5-ethoxy-1,2-benzisothiazolone
2-heptyl-4,6-dichloro-1,2-benzisothiazolone
2-octyl-5-bromo-1,2-benzisothiazolone
2-t-octyl-6-propoxy-1,2-benzisothiazolone
2-nonyl-4-bromo-1,2-benzisothiazolone
2-nonyl-4,6-diethyl-1,2-benzisothiazolone
2-decyl-6-bromo-1,2-benzisothiazolone
2-dodecyl-4,6-dimethyl-1,2-benzisothiazolone
2-t-tridecyl-5-methyl-1,2-benzisothiazolone
2-t-tridecyl-5-ethoxy-1,2-benzisothiazolone
2-t-octadecyl-5-butyl-1,2-benzisothiazolone
2-t-octadecyl-4-chloro-1,2-benzisothiazolone The novel benzisothiazolones of this invention are biocidally active compounds and, as such, are suitable for the control of living organisms and particularly microorganisms. For this reason, they are especially effective bactericidal, algaecidal, fungicidal, and pesticidal agents. Furthermore, these novel compounds possess the unexpected property of being resistant to inhibition by common additives or contaminants such as lecithin, normal

TABLE II.—CHARACTERIZATION OF EXAMPLES

| Example No. | Melting Point (° C.) | Empiracal Formula | Analysis [1] | | | |
|---|---|---|---|---|---|---|
| | | | C | H | N | S |
| 1 | 169–172 | C$_9$H$_8$N$_2$O$_2$S | (51.9) 52.0 | (3.87) 3.85 | (13.5) 13.4 | (15.4) 15.2 |
| 2 | 118–121 | C$_{10}$H$_{10}$N$_2$O$_2$S | (54.0) 54.3 | (4.50) 4.80 | (12.6) 12.5 | (14.4) 14.4 |
| 3 | 89–93 | C$_{15}$H$_{22}$N$_2$O$_2$S | (62.8) 63.8 | (7.23) 7.87 | (9.1) 9.5 | (10.4) 10.4 |
| 4 | 196–199 | C$_{14}$H$_9$ClN$_2$O$_2$S | (55.3) 55.4 | (2.98) 3.11 | (9.2) 9.1 | (10.5) 10.6 |
| 5 | [2] 220–223 | C$_{14}$H$_8$Cl$_2$N$_2$O$_2$S | (49.6) 49.4 | (2.37) 2.72 | (9.3) 8.7 | (9.4) 9.8 |
| 6 | [2] 230–235 | C$_{14}$H$_9$N$_3$O$_4$S | (53.2) 50.8 | (2.88) 3.51 | (13.5) 15.5 | (10.1) 8.3 |

[1] The number parenthesized represents the theoretical value, as calculated, using the empiracal formula of each compound.
[2] Dec.

EXAMPLE 7

In a manner similar to that of Examples 1 to 6, the following compounds are likewise readily prepared:

2-(N-decylcarbamoyl)-1,2-benzisothiazolone
2-(N-dodecylcarbamoyl)-1,2-benzisothiazolone
2-(N-octadecylcarbamoyl)-1,2-benzisothiazolone
2-(N-ethylcarbamoyl)-5-methoxy-1,2-benzisothiazolone
2-(N-t-octylcarbamoyl)-4,6-dichloro-1,2-benzisothiazolone
2-(N-t-octylcarbamoyl)-4,6-diethoxy-1,2-benzisothiazolone
2-(N-dodecylcarbamoyl)-4-propyl-1,2-benzisothiazolone
2-(N-4'-bromophenylcarbamoyl)-6-bromo-1,2-benzisothiazolone
2-(N-3'-chlorophenylcarbamoyl)-4-methyl-6-propyl-1,2-benzisothiazolone
2-(N-3'-chlorophenylcarbamoyl)-4-propyl-1,2-benzisothiazolone
2-(N-3'-4'-dichlorophenylcarbamoyl)-4,6-dimethyl-1,2-benzisothiazolone
2-(N-3'-5'-dimethylphenylcarbamoyl)-4-chloro-1,2-benzisothiazolone
2-(N-4'-nitrophenylcarbamoyl)-6-methyl-1,2-benzisothiazolone

EXAMPLE 8

The following compounds are readily obtained in accordance with the procedure described hereinbefore for the preparation of 2-alkyl benzisothiazolones, namely, by chromate, sodium nitrite, glycerol, propylene glycol and the like. Fungicidal evaluation of representative benzisothiazolones of this invention was carried out by the standard slide spore germination test (cf. Phytopathology, 33, 627 (1943), utilizing spores of Alternaria solani (Alt.), Sclerotinia fructicola (Scl.) and Stemphylium sarcinaeforme (Stem.) or Botrytis cinerea (Bot.). The values obtained for the concentration in parts per million (ppm.) which effectively controlled 50% of the spores (ED$_{50}$) are given in Table III.

Antibacterial activity was evaluated by the Serial Dilution Test (Broth Titer Test) wherein a series of broths containing varying dilutions of a test compound and an organism are halved starting with 1:1000. The values obtained which are also shown in Table III represent the maximum dilution at which the compound under evaluation renders complete control of the organism. Staphylococcus aureus (S. aureus) and Escherichia coli (E. coli) were the bacterial organisms employed in this test.

TABLE III.—MICROBIOLOGICAL ACTIVITY

| Example No. | Fungicidal evaluation | | Stem (Bot.) | Bacteriostatic evaluation | |
|---|---|---|---|---|---|
| | Alt. | Scl. | | S. aureus | E. coli |
| 1 | <1 | <1 | 10–50 | 1:32,000 | 1:8,00 |
| 2 | 10–50 | <1 | 10–50 | 1:16,000 | 1:8,000 |
| 3 | 10–50 | >1,000 | 200–1000 | 1:2,000 | 1:1,000 |
| 4 | 50–200 | 200–1000 | >1,000 | 1:8,000 | 1:2,000 |
| 5 | 50–200 | 200–1000 | 50–200 | 1:1,000 | 1:1,000 |
| 6 | 200–1000 | 10–50 | 10–50 | 1:1,000 | 1:1,000 |

When plant seeds are deposited in the soil, especially soil having a high moisture content, they are particularly susceptible to the attack of fungi, such as for example, Pythium. Because of the exceptional fungicidal activity exhibited by the benzisothiazolones, these compounds have proven to be extremely valuable in seed treatment applications. By seed treatment is meant the disseminating of a biocidally active material over a seed subject to the attack of microorganisms, and particularly fungi, in an amount which is effective to control such microorganisms without deleteriously effecting such seed. In addition to Pythium, fungi such as Rhizopus, *Fusarium roseum, Verticullium albo-atrum*, Rhizoctonia, and Penicillium are typical of those which attack numerous crop seeds.

The amount of benzisothiazolones required so as to be effective in a seed treatment application will vary depending upon conditions, such as the type of seed, the method of application, soil and atmospheric conditions, and the like. Generally, an application in the range of about 0.25 to 20 ounces of active ingredient, namely, the benzisothiazolone per 100 pounds of seed will be effective to control any undesirable microorganisms and so provide protection to the seed. An application of active agent in the range of about 1.0 to 10 ounces per 100 pounds of seed is preferred.

Evaluation of the benzisothiazolones with regard to pesticidal activity demonstrated their exceptional control of numerous nematodes, mites, insects, such as, beetles and aphids and the like. Some typical nematodes, insects and mites which were controlled when contacted with the compounds of this invention included the following: Northern root knot nematode (*Meloidogyne hapla*), Mexican bean beetle (*Epilachna varivesta*), black carpet beetle (*Attagenus piceus*), confused flour beetle (*Tribolium confusum*), granary weevil (*Sitophilus granarius*), two spotted mite (*Tetranychus urticae*), house fly (*Musca domestica*), Southern armyworm (*Prodenia eridania*), German cockroach (*Blattella germanica*) and green peach aphid (*Myzus persicae*).

Generally, control of a living organism is achieved in accordance with this invention by contacting the organism with a benzisothiazolone in an amount which is effective to control said organism. Any of the techniques known in the art may be employed to disseminate the benzisothiazolones in a manner so as to achieve the desired contact with the organism to be controlled. Spraying, painting, immersing and fumigating are typical of such techniques.

The compounds of this invention may be readily utilized as slimicides, algaecides, bactericides, fungicides or combinations thereof in any loci and particularly in aqueous media, such as for example, water-cooling systems, swimming pools, paper pulp processes, etc. In addition, these compounds and/or compositions thereof may serve functions, such as, preservatives, especiallly fabric preservatives, soap additives, sanitizing agents, and preservatives for metal working compounds and the like.

In general, a loci subject to attack by microorganisms may be protected in accordance with this invention by incorporating into said loci a benzisothiazolone in an amount which is effective to control said microorganisms. The exact amount of benzisothiazolone required will, of course, vary with the medium being protected, the microorganisms being controlled, the particular benzisothiazolones or compositions thereof being employed and the like. Typically, in a liquid media excellent control is obtained when the benzisothiazolones are incorporated in the range of 0.1 to 10,000 parts per million (p.p.m.) or 0.00001 to 1% based on the weight of the medium. A range of 1 to 2000 p.p.m. is preferred.

The term "control," as employed in the specification and claims of this application is to be construed as any means which adversely affects the existence or growth of any microorganism or living organism. Such means may comprises a complete killing action, eradication, arresting in growth, inhibition, reduction in number or any combination thereof.

Outstanding fungistatic activity by the benzisothiazolones was exhibited when they were employed as paint preservatives and paint fungistats. Microbial activity in acrylic based paint emulsions is effectively inhibited when these compounds are incorporated at the rate of about 2–20 pounds or more per 100 gallons of paint.

The benzisothiazolones of this invention are especially useful as agricultural fungicides. As such, they are particularly valuable when formulated in a fungicidal composition. Such compositions normally comprise an agronomically acceptable carrier and the compounds disclosed herein as the active agent or agents. Where necessary or desirable, surfactants or other additives may be incorporated to give uniformly formulated mixtures. By "agronomically acceptable carrier" is meant any substance which can be utilized to dissolve, dispense or diffuse the chemical incorporated therein without impairing the effectiveness of the toxic agent and which does no permanent damage to such environment as soil, equipment and agronomic crops.

For use as pesticides, the compounds of this invention are usually taken up in an agronomically acceptable carrier or formulated so as to render them suitable for subsequent dissemination. For example, the benzisothiazolones may be formulated as wettable powders, emulsion concentrates, dusts, granular formulations, aerosols or flowable emulsifiable concentrates. In such formulations, the benzisothiazolones are extended with a liquid or solid carrier and, when desired, suitable surfactants are likewise incorporated.

Compounds of this invention may be dissolved in a water-miscible liquid, such as ethanol, isopropanol, acetone, and the like. Such solutions are easily extended with water.

The benzisothiazolones may be taken up on or mixed with a finely particled solid carrier, as for example, clays, inorganic silicates, carbonates, and silicas. Organic carriers may also be employed. Dust concentrates are commonly made wherein the benzisothiazolones are present in the range of 20 to 80%. For ultimate applications these concentrates are normally extended with additional solid from about 1 to 20%.

Wettable powder formulations are made by incorporating the compounds of this invention in an inert, finely divided solid carrier along with a surfactant which may be one or more emulsifying, wetting, dispersing or spreading agents or blend of these. The benzisothiazolones are usually present in the range of 10 to 80% by weight and the surfactants in from 0.5 to 10% by weight. Commonly used emulsifying and wetting agents include polyoxyethylated derivatives of alkyl-phenols, fatty alcohols, fatty acids and alkylamines; alkylarene sulfonates and dialkyl sulfosuccinates. Spreading agents include such materials as glycerol mannitan laurate and a condensate of polyglycerol and oleic acid modified with phthalic anhydride. Dispersing agents include such materials as the sodium salt of the copolymer of maleic anhydride and an olefin such as diisobutylene, sodium lignin sulfonate and sodium formaldehydenaphthalene sulfonates.

One convenient method for preparing a solid formulation is to impregnate the benzisothiazolone toxicant onto the solid carrier by means of a volatile solvent, such as acetone. In this manner, adjuvants, such as activators, adhesives, plant nutrients, synergists and various surfactants, may also be incorporated.

Emulsifiable concentrate formulations may be prepared by dissolving the benzisolthiazolones of this invention in an agronomically acceptable organic solvent and adding a solvent-soluble emulsifying agent. Suitable solvents are usually water-immiscible and may be found in the hydrocarbon, chlorinatel hydrocarbon, ketone, ester, alcohol and amide classes of organic solvents. Mixtures of solvents are commonly employed. The surfactants useful as emulsifying agents may constitute about 0.5% to 10% by weight of the emulsifiable concentrate and may be anionic, cationic or non-ionic in character. Anionic surfactants include alcohol sulfates or sulfonates, alkylarene sulfonates and sulfosuccinates. Cationic surfactants include fatty acid alkyl amine salts and fatty acid alkyl quaternaries. Non-ionic emulsifying agents include ethylene oxide adducts of alkylphenols, fatty alcohols, mercaptans and fatty acids. The concentration of the active ingredients may vary from 10 to 80%, preferably in the range of 25 to 50%.

For use as phytopathogenic agents, these compounds should be applied in an effective amount sufficient to exert the desired biocidal activity by techniques well known in the art. Usually, this will involve the application of the benzisothiazolones to the loci to be protected in an effective amount when incorporated in an agronomically acceptable carrier. However, in certain situations it may be desirable and advantageous to apply the compounds directly onto the loci to be protected without the benefit of any substantial amount of carrier. This is a particularly effective method when the physical nature of the benzisothiazolones is such as to permit what is known as "low-volume" application, that is, when the compounds are in liquid form or substantially soluble in higher boiling solvents.

The application rate will, of course, vary depending upon the purpose for such application, the benzisothiazolones being utilized, the frequency of dissemination and the like.

For use as agricultural bactericides and fungicides, dilute sprays may be applied at concentrations of 0.05 to 20 pounds of the active benzisothiazolone ingredient per 100 gallons of spray. They are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated or low-volume sprays the materials are applied as mists.

The compounds of this invention may be utilized as the sole biocidal agents or they may be employed in conjunction with other fungicides, bactericides, algaecides, insecticides, miticides and comparable pesticides.

What is claimed is:
1. A compound of the formula:

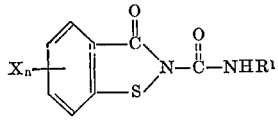

wherein $R^I$ is alkyl of 1 to 18 carbon atoms or an aryl group of the formula:

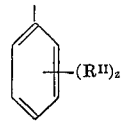

wherein $R^{II}$ is alkyl of 1 to 6 carbon atoms, halogen or nitro, and $z$ is an integer from 0 to 3; and X is halogen, alkyl of 1 to 4 carbon atoms, or alkoxy of 1 to 4 carbon atoms and $n$ is an integer from 0 to 2.

2. A compound according to claim 1 wherein X is halogen.

3. A compound according to claim 1 wherein $R^I$ is alkyl of 1 to 18 carbon atoms.

4. A compound according to claim 1 wherein $R^{II}$ is alkyl of 1 to 6 carbon atoms.

5. A compound according to claim 1 wherein $R^I$ is 3′,4′-dichlorophenyl.

6. A compound according to claim 3 wherein $R^I$ is methyl.

7. A compound according to claim 3 wherein $R^I$ is ethyl.

8. A compound according to claim 6 wherein said compound is 2-(N-methylcarbamoyl)-1,2-benzisothiazolone.

9. A compound according to claim 7 wherein said compound is 2-(N-ethylcarbamoyl)-1,2-benzisothiazolone.

References Cited

UNITED STATES PATENTS 2,870,015   1/1959   Allen et al. _____ 260—304

FOREIGN PATENTS 848,130   9/1960   Great Britain.

OTHER REFERENCES

Boggiano et al., J. Pharm. and Pharmacol., vol. 13, 1961, pp. 567–74.

ALEX MAZEL, Primary Examiner

R. J. GALLAGHER, Assistant Examiner

U.S. Cl. X.R.

424—270